Jan. 23, 1940. A. G. FAHNESTOCK 2,188,110
MOWER
Filed May 6, 1939
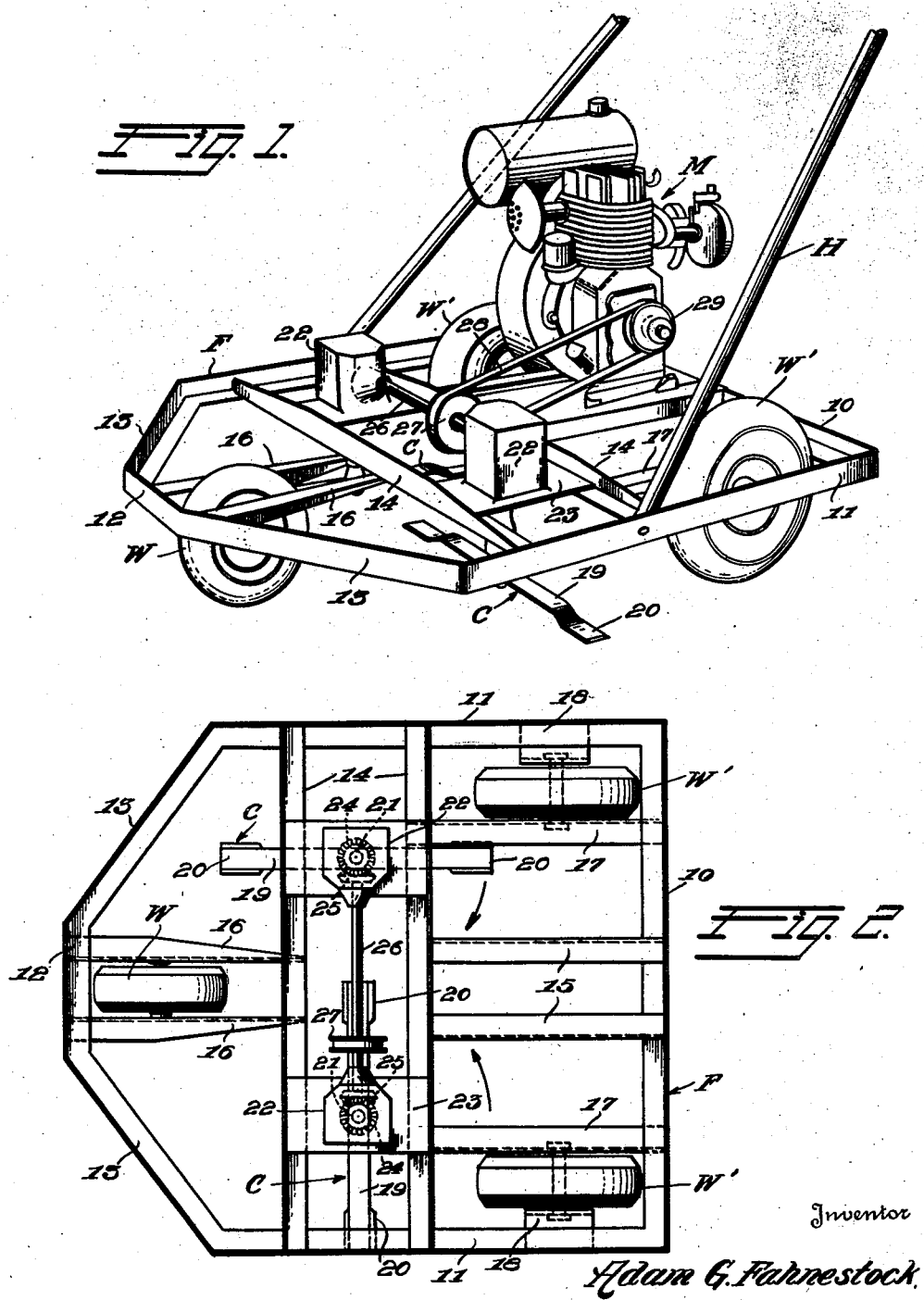

Patented Jan. 23, 1940

2,188,110

UNITED STATES PATENT OFFICE 2,188,110

MOWER

Adam G. Fahnestock, Lititz, Pa.

Application May 6, 1939, Serial No. 272,240

4 Claims. (Cl. 56—25)

This invention relates to new and useful improvements in mowers.

A primary object of the invention is the provision of a mower or grass cutter having a plurality of ground-engaging wheels and power-driven cutting members so constructed and arranged that only one of the wheels travels through the uncut grass during the mowing operation.

A further object of the invention is the provision of a lawn mower having power-driven cutting members so arranged that they are capable of cleanly cutting or trimming grass along curbs, sides of buidings, and like objects, the cutting members having associated therewith guards for preventing damage thereto while permitting such close trimming operation.

A still further object of the invention is the provision of a lawn mower having a pair of rear wheels and a single front wheel, and a pair of horizontally disposed rotary cutting members arranged between the rear and front wheels whereby the cut grass is thrown to the rear of the mower and a well balanced structure for maximum efficiency and ease of operation is provided.

A still further object of the invention is the provision of a lawn mower which is relatively simple in construction, highly efficient in operation, and which is capable of operation with minimum effort on the part of the operator.

For a more complete understanding of the nature and objects of the invention, reference will be had to the following detailed description, taken in connection with the accompanying drawing, wherein:

Figure 1 is a perspective view of the improved mower constructed in accordance with a preferred embodiment thereof.

Fig. 2 is a top plan view of the mower with certain parts omitted for greater clarity in illustration.

Referring now in detail to the drawing by reference characters, and wherein like characters designate like parts in the two views, the letter F designates a frame which may be constructed of any suitable material but preferably and as illustrated is constructed of relatively light gauge angle iron.

The frame F includes a continuous marginal portion comprising a rear strip 10, parallel side strips 11 at right angles to the rear strip 10, a relatively short front strip 12 parallel with the strip 10 and a pair of forwardly converging strips 13 uniting the strips 11 and 12. Thus, the frame F is substantially of rectangular formation except for the converging strips 13 which, together with the side strips 11, function in a manner later described.

The frame F further includes a pair of strips 14, between and parallel with the strips 10 and 12, which are adapted to support the cutting members.

A pair of motor-supporting strips 15 is disposed between strip 10 and the adjacent strip 14 and arranged substantially centrally of the width of the frame. The frame further includes a pair of parallel strips 16 substantially in longitudinal alinement with strips 15 for supporting the front wheel, and a pair of strips 17 which, in cooperation with brackets 18, support the rear wheels.

The wheels are three in number, and are disposed wholly within the marginal portion of the frame, the front wheel W being suitably journaled in the depending flanges of the angle iron strips 16 and the rear wheels W' being suitably journaled in the angle iron strips 17 and brackets 18.

The wheels W and W' may be of any desired type, but are preferably pneumatic or are provided with solid rubber treads.

The cutting members C each includes an elongated member 19 having suitable blades 20 on the opposite ends thereof. The members 19 are medially secured to vertical shafts 21 which, adjacent their upper ends, are suitably journaled in gear boxes 22 carried by plates 23 supported on the angle iron strips 14.

Each shaft 21 is provided with a bevel gear 24 in operative mesh with a like bevel gear 25 on the corresponding end of a shaft 26.

The shaft 26 extends horizontally between the gear boxes 22, and has its opposite ends suitably journaled therein.

A pulley 27 is secured to the shaft 26 and is driven by a belt 28 operatively engaged therewith as well as with a similar pulley 29 on a gasolene motor M supported on the angle iron strips 15.

A suitable handle H is pivotally connected with the side strips 11 of the frame, as clearly indicated in Fig. 1.

The cutting members C are driven in opposite directions and toward the center of the frame, as indicated by the arrows in Fig. 2, whereby the cut grass is thrown to the rear of the machine or onto the cut area.

As is clearly illustrated in Fig. 2, the cutting blades 20, when in transverse position, extend exactly to the planes of the outer faces of the side strips 11 of the frame whereby a strip of grass equal in width to that of the frame is cut, with the result that the inset rear wheels W' will run over the mowed area and the front wheel W only will travel through the uncut grass.

The above described arrangement is an important consideration in horizontal rotary-blade mowers, for the reason that trampled-down grass cannot be cleanly cut and thus, by avoiding the passage of the rear wheels through the uncut grass, a much neater and cleaner mowing operation is accomplished.

Furthermore, by the position of the cutting blades 20 relative to the side strips of the frame, as above noted, the machine is capable of neat and accurate trimming operations and the side strips 11, while permitting cutting to the outer margins thereof, effectively function as guards to prevent damage to the cutting blades.

The converging strips 13 function to avoid jamming of the frame when approaching an object, such as a wall, as same will ride along the wall and aid in moving the frame laterally until the adjacent side strip 11 engages the wall, at which time the cutting members will trim closely along the wall.

From the foregoing explanation, it will be appreciated that the disposition of the wheels and cutting members relative to the frame and to each other provides marked advantages. It is to be further noted, however, that the positioning of the power-driven cutting members between the front and rear wheels provides a well balanced construction which is highly advantageous in hand-propelled mowers, in that the weight and power reactions are substantially equalized on the individual wheels.

While the improved mower as disclosed is adapted for manual transportation, nevertheless it will be understood that the rear wheels W' may, if desired, be secured to a through-shaft and the shaft suitably driven by the motor M. It is preferable, however, that the mower be manually transported or moved, for the reason that the speed of the mower can be controlled, as when mowing around or between objects such as hedges and the like, and the cutting members will rotate at top speed for thorough cutting of the grass.

The mower is relatively light in weight and, due to its highly balanced construction, it is capable of use with little effort on the part of an operator.

While I have disclosed but a single specific embodiment of my invention, nevertheless such is to be considered as illustrative only and not restrictive, the scope of the invention being defined in the sub-joined claims.

What I claim and desire to secure by United States Letters Patent is:

1. In a mower, a horizontal frame comprising a marginal portion including a rear strip, parallel side strips at right angles to the rear strip, a relatively short front strip parallel with the rear strip, and forwardly-converging strips interconnecting the side and front strips, a pair of ground-engaging wheels journaled within the frame adjacent the rear and side strips, a single ground-engaging wheel journaled within the frame adjacent the front strip, a pair of horizontally disposed vertical axis rotary cutters journaled in the frame intermediate the front and rear strips, and power means supported by the frame for driving the cutters.

2. The structure defined in claim 1, wherein said rotary cutters each includes an elongated member having a cutting blade on each end, the outer ends of the blades rotating in circles tangent with the planes of the outer sides of the side strips.

3. In a mower, a frame including an endless marginal portion, a pair of ground-engaging wheels journaled in the frame within the marginal portion and adjacent one end thereof, a single ground-engaging wheel journaled in the frame within the marginal portion and adjacent the opposite end thereof, a pair of laterally spaced gear boxes supported by the frame intermediate the opposite ends thereof, a vertical shaft journaled in each gear box and having a horizontal rotary cutter secured to its lower end and a bevel gear secured to its upper end within the gear box, a horizontal shaft having its opposite ends journaled in the gear boxes and also having bevel gears meshing with the first-named bevel gears, and power means supported by the frame for driving the horizontal shaft and thereby rotating the rotary cutters.

4. In a mower, a horizontal frame including an endless marginal portion, ground-engaging wheels journaled in the frame wtihin the marginal portion, horizontal rotary cutters journaled in the frame and having a combined cutting range equal to the width of the frame, including parallel opposite side strips effective as guards and the marginal portion further including forwardly converging frame deflecting strips.

ADAM G. FAHNESTOCK.